United States Patent [19]

Ress et al.

[11] 4,099,053

[45] Jul. 4, 1978

[54] DEVICE FOR THE SEPARATION OF GAS MIXTURES

[75] Inventors: Thomas I. Ress, Fullerton; Frederick Hartmann, Rolling Hills Estates, both of Calif.

[73] Assignee: Kreidl Chemico Physical K.G., Schaan, Liechtenstein

[21] Appl. No.: 793,038

[22] Filed: May 2, 1977

[51] Int. Cl.$^2$ .................... B01D 59/44; H01J 39/34
[52] U.S. Cl. .................................. 250/293; 250/298
[58] Field of Search ............... 250/281, 282, 283, 284, 250/286, 287, 290, 293, 298, 299

[56] References Cited

U.S. PATENT DOCUMENTS

| 2,957,985 | 10/1960 | Brubaker | 250/287 |
| 3,107,295 | 10/1963 | Tretner | 250/293 |
| 3,308,293 | 3/1967 | Mathams | 250/283 |

*Primary Examiner*—Harold A. Dixon
*Attorney, Agent, or Firm*—Singer & Singer

[57] ABSTRACT

Pulses of ionized gas mixtures are generated periodically, to be entrained and accelerated inside a vessel in a predetermined direction by magnetic waves traveling transverse to the plasma motion. Phase coherence between the pulse train and the magnetic waves is maintained. The forces exerted by the magnetic waves cause the ion mixture of each pulse packet to be sorted into several separate packets in some of which the original concentration of a specific ion has been greatly increased or decreased. The waves then drive each packet into a separate branch of the vessel for recovery. The distance between these branches depends on the timing of the mixed pulse relative to the crest of the magnetic waves, on ion mass-to-charge differences, and on the intensity of the magnetic field. The separation efficiency may be enhanced by reducing the intensity of the magnetic field, by raising its frequency, and by shortening the mixed plasma packets while increasing their density. The traveling magnetic waves are generated by a chain of inductively coupled solenoids, excited in staggered phase relationship.

7 Claims, 4 Drawing Figures

DEVICE FOR THE SEPARATION OF GAS MIXTURES

FIELD OF INVENTION

Our present invention relates to a method and device for the separation of a mixed gaseous plasma into some or all of its components, a device in which the forces exerted by traveling magnetic waves separate the ions of the mixture into different and separately collectable plasma packets of substantially uniform composition.

BACKGROUND OF THE INVENTION

Non-ionic gas separation methods although widely used in the chemical industry are sometimes inefficient, especially if the components to be separated are chemically closely related, or are isotopic elements or compounds, or in view of very high temperatures or pressures used the separation is incomplete. The gaseous diffusion method, for example, requires a very high initial investment, needs many sequential stages for a moderate enrichment of a desired compound, and requires for its operation enormous amounts of power.

The centrifugal and nozzle processes, while offering higher separation factors, are subject to mechanical breakdowns and disruptions, and due to large power consumption are also quite uneconomical.

In conventional electromagnetic mass separators only the ions of a gas mixture are accelerated by an electric field, deflected by a powerful magnetic field according to the ion mass value, and fed into separate exit ports for collection. This method of mass separation consumes much power, and yet produces only very small flow rates due to space charge effects. For example, the Calutron mass separator consumes over 150,000 kilowatt-hours for processing just one kilogram of ionized matter. Electromagnetic mass separation has therefore been restricted to small-scale extraction of rare elements, and of stable or radio-active isotopes needed for medical or scientific purposes.

OBJECTS OF THE INVENTION

The general object of our present invention is to provide an electromagnetic plasma mass separator capable of generating high mass flow rates at low power consumption.

Another objective is the achievement of high enrichment factors of the valuable components of the mixture with only a small number of stages.

Another objective is the removal of some undesirable component of the mixture.

Another related objective is the attainment of the above goals with a low initial investment.

Another objective is the efficient separation and collection of rare and closely related compounds and of isotopic elements and compounds.

It is also the object of our invention to provide a practical and efficient method for achieving several or all purposes set forth.

SUMMARY OF THE INVENTION

The basic principle underlying our present invention is the use of traveling magnetic waves for entraining and accelerating pulses of a plasma mixture in order to sort the ions of the mixture into separate packets in some of which the concentration of a specific ion has been greatly increased or decreased, and to drive each ion packet into a separate branching path for recovery.

Past theoretical and experimental studies have proven that pulses of ionized matter can be accelerated by traveling magnetic waves. Shape and length of the plasma acceleration paths depend on the ions' mass-charge ratio, on the intensity and velocity of the magnetic waves, and, as we have found, to a large degree on the timing or "phase" of the plasma pulses relative to the crest of the magnetic waves. The strong dependence of the plasma pulse trajectory on the entrainment timing is caused by the fast changing interaction of the magnetic wave sweeping with constant velocity over the gradually accelerating plasma ion. Depending on the starting phase, the ion is exposed to a magnetic field intensity which may increase, decrease, change polarity, or remain nearly constant over part of the drive cycle. For some trajectories we computed and observed "cusps", i.e. regions in which an ion velocity decrease to zero is followed by an increase in the opposite direction. These cusps occur relatively early in the cycle long before the maximum speed of the ions (which is twice that of the field) has been reached.

In numerous plasma experiments with hydrogen, nitrogen, and other single gases, and with gas mixtures, under various conditions of pressure, intensity and velocity of the magnetic field, and at different phase angles, the plasma stream in the form of a sequence of plasma packets was observed and photographed as a continuous luminous trail whose shape and special features closely coincided with those predicted by the theory. The decisive element of our separation process lies in the fact that traveling magnetic waves acting on mixed plasma packets accelerate ions of lower mass-to-charge ratio faster than those of higher mass-to-charge ratio, and drive them in a different direction.

Other experiments have shown that the ions of plasma packets, moving in the same direction while surrounded by an electron atmosphere, generate strong compression forces in a direction perpendicular to their velocity vector. The effect is similar to the mutual attraction of adjacent wires carrying currents in the same direction. The compressive forces increase with the velocity of the plasma ions, become zero if the ions stand still, and turn into a repulsion if the ions move in opposite directions. In the case of a mixture of lighter and heavier ions the compression may be strong enough to hold the lighter ions of the pulse close to the dominant heavier ions. The pulse packets will overlap and in many cases do not separate. However, when packets of ions with smaller mass approach their cusp point, their velocity drops to the point where the containment forces for the lighter ions become smaller than the external drive field forces. As a result, the whole packet of lighter ions is separated by the external forces and driven off into a branching direction. The separation process could be continued for other packets of larger mass-charge ratio during the same run, to take advantage of the ionization and drive power invested.

A second method for separating mixed plasma packets by means of a traveling magnetic field may be used at other launch phases, where no cusps near the launching point exist. The lighter ions of a binary mixed plasma packet are accelerated faster than the heavier ions, which will lag behind. The front and back end ions are thus gradually freed from the combined compression force and will follow different trajectories. After the lighter ions reach the apex of their trajectory, they will move downward while the heavier ones will continue on their upward course. Due to the difference in direction, the compressive force drops to a low value and may even turn into a repulsive force. After the original mixed packet has been completely divided into two separate packets and a sufficient physical separation has been achieved, both packets can be collected separately. The method works best with relatively short plasma packets.

Experiments have shown that the plasma packets separated by both methods are also compressed into cylindrical packets of small diameter during their travel in the branching direction. This phenomenon enhances the resolution of the process.

Since high plasma currents can be generated with ion energies of only a few electron volts, the new process makes it possible to separate mixtures of ionized matter with a drive power input of a few kilowatt-hours per kilogram.

The traveling magnetic waves are generated by an interlinked array of solenoids, excited by alternating currents in staggered phase relationship. The drive frequency is chosen to achieve the required mass-flow performance while keeping the kinetic energy of plasma ions during the separation process to a minimum. The solenoids of the drive array generate magnetic flux in a direction predominantly vertical to the motion of the traveling waves. These waves are applied to all sections and branches of the processing vessel. The efficiency of the array may be increased by a common yoke of high permeability, bridging the large airgap outside the processing vessel. In all cases, timing means must be provided to maintain phase coherence between the pulse train and the magnetic waves.

The plasma packets extracted from the mixed plasma flow are collected at the exit ports of each branch of the processing vessel. After neutralization, the gaseous or liquid end products may be pumped into storage tanks, while solid substances may be accumulated in special receptacles.

The efficiency of the plasma separation process may be improved by generating traveling magnetic waves of special wave shape, in order to increase the distance between branching points of different substances to be extracted from the mixture and to reduce the power consumed by the separation process.

The enrichment factor of a valuable compound extracted from a mixture of compounds may be further enhanced by providing a secondary separation/extraction branch, which is derived from the primary branch. The secondary branch would also be powered by an array of inductively linked solenoids. In a similar manner, third and higher-order branches, each derived from a lower-order branch, may be added.

BRIEF DESCRIPTION OF THE DRAWING

The above and other features of our invention will now be described in detail with references to the accompanying drawing in which.

SPECIFIC DESCRIPTION

We shall describe the basic principles of the separation of plasma packets with the aid of two specific examples, the first based on the "cusp" method, the second on the "differential speed" method. It should be understood that the examples describe only two of several possible separation methods based on the use of a traveling magnetic field. In the first specific example, the separation of three gaseous elements in the plasma state, rests on computations and confirming experiments, in which a mixture of nitrogen (mass 14), oxygen (mass 16), and neon (essentially mass 20) was used.

Figure 1:
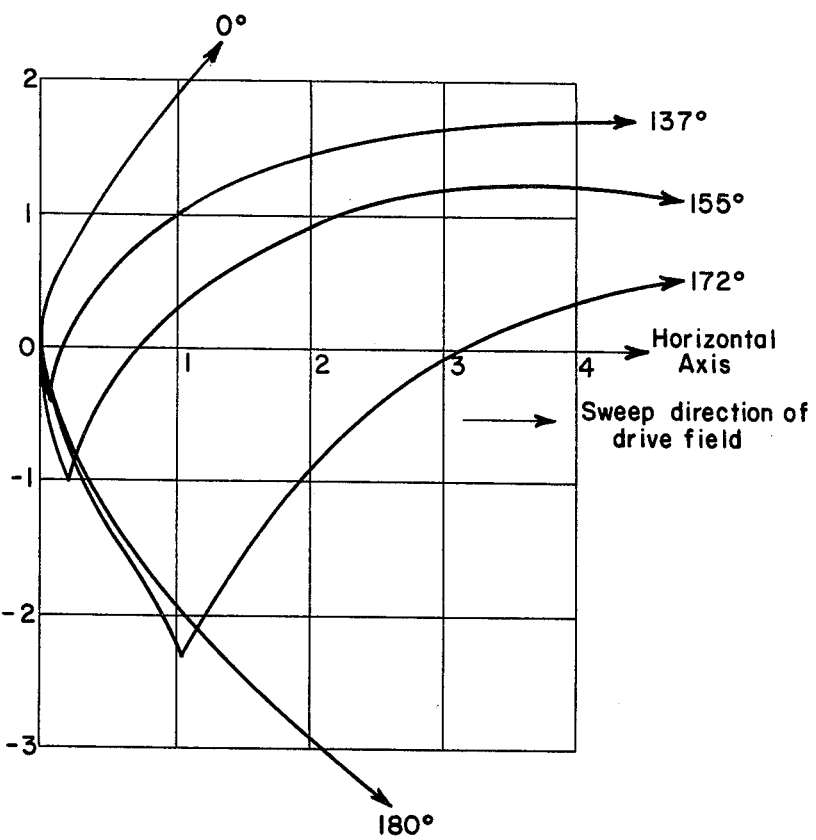
FIG. 1 shows examples of computed trajectories of plasma packets driven by traveling magnetic waves. Each curve in this drawing indicates the trajectory of a plasma packet released at a different phase angle in relation to the positive crest of the traveling magnetic waves, expressed in degrees.

FIG. 1 shows a few "normalized" plasma trajectories for several "delta" values, indicating the injection phase angle, or timing, of the release of plasma packets relative to the peaks of the magnetic waves used to accelerate them. the "normalized" trajectories may roughly be converted for any specific case into meters and seconds by simply multiplying the coordinates with a factor:

$$f = v_B M/qB$$

where $v_b$ is the speed of the traveling magnetic waves (meter/ second), $M$ the mass of the ion (kilogram), $q$ the electric charge (Coulomb), and B the peak amplitude of the magnetic flux intensity (webers/m$^2$). The strong dependence of the trajectories on the phase angle delta, and the deep cusps, particularly for a delta of 172°, are evident. (The second kind of cusp occurring at the end of the period for 0° and 180° lies outside the range of FIG. 1). The plasma packet for a lead angle of 172°, for example, is first accelerated downward by the negative half-wave of the magnetic drive field, then decelerated by the changing drive field polarity, until stopped and re-accelerated upward and to the right by the positive half-wave.

Figure 2:
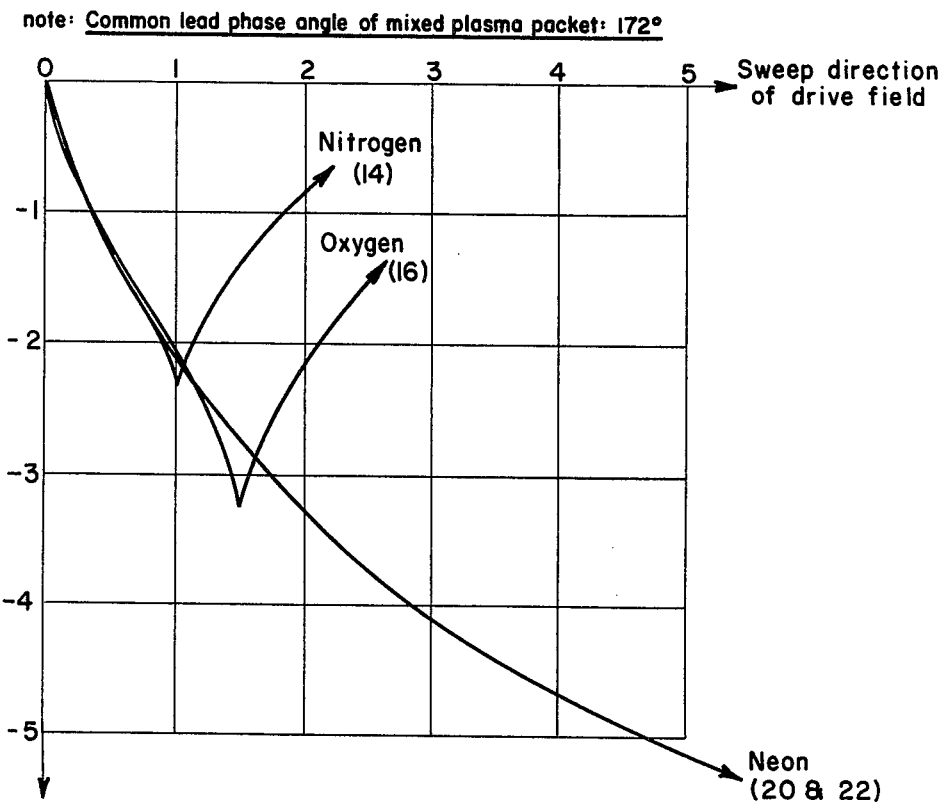
FIG. 2 shows the two different branching paths of two ion packets of lower ion masses, and the continuing path of the heavier components of the original plasma mixture.

FIG. 2 illustrates the separation of mixed plasma packets into separate packets by the cusp method for a lead angle of 172°. While the nitrogen trajectory is a mere repetition of the one shown in FIG. 1, the orbits of oxygen and neon are different because of their different ion mass/charge ratios. The nitrogen plasma packets, due to their low mass/charge ratio, are separated first from the common flow at their cusp point, to be driven upward by the traveling magnetic drive field. Further down to the right, the oxygen plasma packets reach their cusp point, and are then propelled upward. The heavier neon plasma packets, with mass numbers of 20 and 22, continue along their path without being deflected.

The plasma trajectories shown in FIG. 2 have been computed; they also have been observed in the laboratory in form of luminous filaments produced by collisions with the molecules of an added hydrogen atmosphere. The observations showed clearly a mixed plasma filament — corresponding to the neon trail shown in FIG. 2 — and two trails branching off upward and to the right, obviously the nitrogen and oxygen trails. The starting portion of the branching trails remained invisible, since the kinetic energy of the ions near the cusp points was too low for exciting visible radiation of the hydrogen gas. Beyond the low energy zones both branching filaments became clearly visible. The extracted gases could be collected separately. With proper adjustments of the drive field even the neon isotopes 20 and 22 could be clearly observed in form two adjacent luminous trails.

Figure 3:
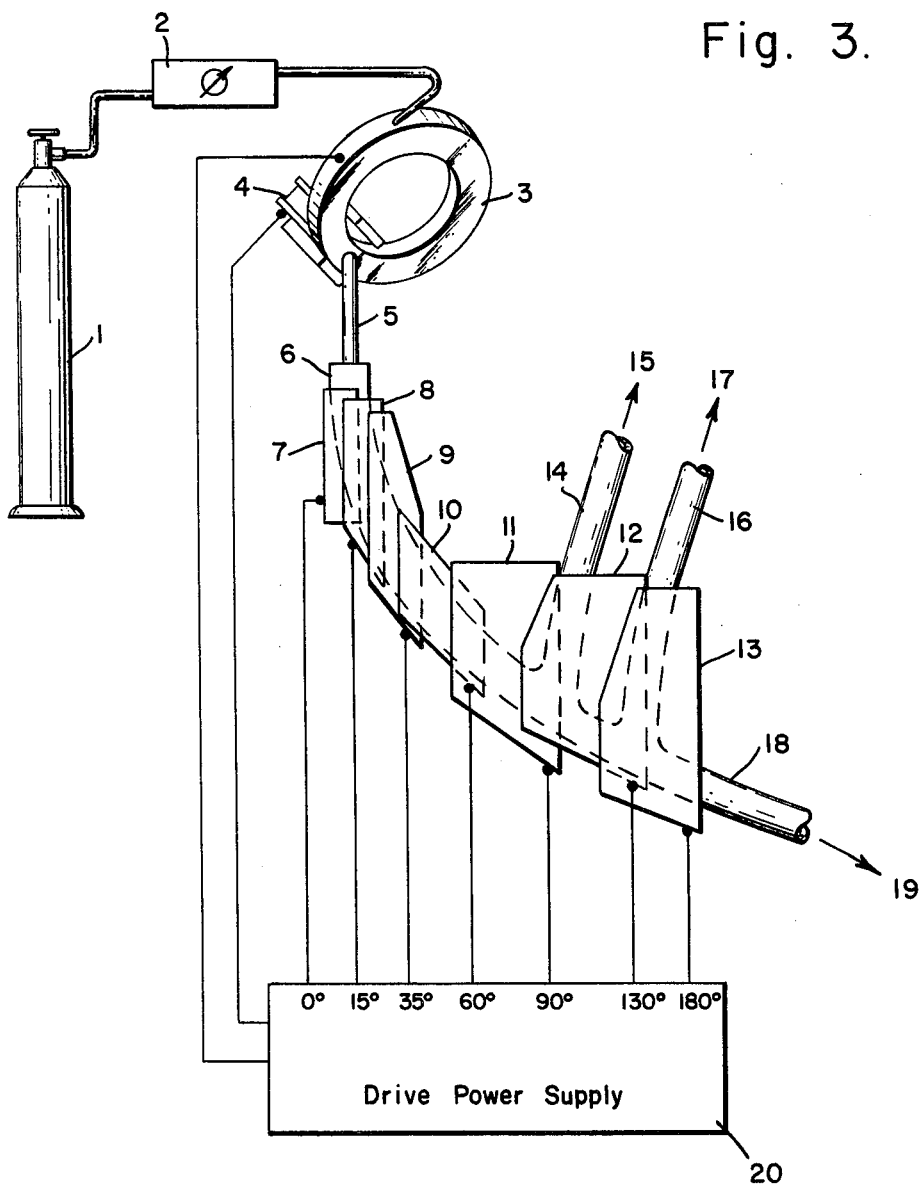
FIG. 3 shows a schematic diagram of a mass separator device for a ternary mixture, equipped with a main and two branch sections.

FIG. 3 shows a schematic drawing of one of the preferred configurations of our mass separation device for a ternary gas mixture. The configuration is based on the occurrence of a cusp in the trajectories of the two lighter plasma components.

The mixture of gaseous substances to be separated into its components, stored in container 1 in compressed form, is fed through a flow control device 2 into a plasma pulse generator 3, where the gas mixture is ionized and driven into rotary circulation by a revolving magnetic field. A small electromagnet 4 is energized periodically by drive power supply 20 to deflect into duct 5 a rapid sequence of plasma packets in synchrony with the magnetic drive field. Upon entering the tubular processing vessel 6 the plasma packets are entrained by the traveling magnetic field for processing. The shape of vessel 6 and its branching sections 14 and 16 are predetermined by the trajectories of the ternary plasma mixture and the shape of the trajectories of each plasma component after its separation and deflection from the common flow path. The vessel must enclose, but not be touched by, all plasma packets before and after separation.

The plasma pulses entering vessel 6 through duct 5 are entrained and accelerated by traveling magnetic waves generated by a chain of interlinked solenoids 7, 8, 9, 10, 11, 12, and 13, which are energized in staggered phase relationship by the drive power supply 20. The waves travel from left to right of the device shown in FIG. 3, with the magnetic flux essentially vertical to the illustration plane. The relative location, shape, and excitation phase of the drive poles must be carefully designed to keep the sweep direction of the magnetic field nearly parallel to the base line, while providing all of the processing vessel and branching tubes with the proper magnetic drive field intensity.

It is advantageous to use small phase staggering steps at the left side where the plasma packets are beginning to accelerate in a vertical direction, and to enlarge the phase increments as the plasma flow bends into a horizontal direction.

FIG. 3 represents an example of the relative phase angles of the array of solenoids.

| Solenoid Item No | Relative Phase Angle |
| --- | --- |
| 7 | 0° |
| 8 | 15° |
| 9 | 35° |
| 10 | 60° |
| 11 | 90° |
| 12 | 130° |
| 13 | 180° |

A rapid sequence of plasma packets is released by the ion source in synchrony with the magnetic waves and with an injection phase centered at 172° ahead of the positive peak of the magnetic drive field.

The enrichment factor and mass flow rate achievable for a given ion separation task depend on the ratio of the ion masses in the mixture, their abundance, on the size of the plasma packets, and on the drive field characteristics. It is necessary to reach some compromise between enrichment factor and mass flow per run. As a rule, the separation of heavy compounds of nearly equal mass requires much smaller plasma packets than the separation of light compounds.

In our example shown in FIG. 3, the component of an air plasma mixture with the lowest mass-charge ration, nitrogen, is driven into branch 14 to be neutralized and collected at 15. The next heavier ingredient, oxygen, is driven into branch 16 for collection at 17, while the heaviest ions — neon (or possibly argon) proceed through 18 for collection at 19.

It is obvious that binary plasma mixtures could be separated into two components by a device similar to the one shown in FIG. 3, except that only one branch is needed. Conversely, mixtures of four or more gases could be separated by providing one or more additional branches.

FIG. 3 also indicates schematically the interlinked magnetic drive coil structure needed for generating the traveling magnetic drive field. The coils are preferably placed symmetrically on both sides of the vessel to keep the direction of magnetic flux nearly vertical to the plasma flow plane.

As is well known in the state of art, the drive coils may also be provided with a common yoke of high permeability to increase the power efficiency of the separator device, and for further improving the uniform coverage of the magnetic drive field.

Figure 4:
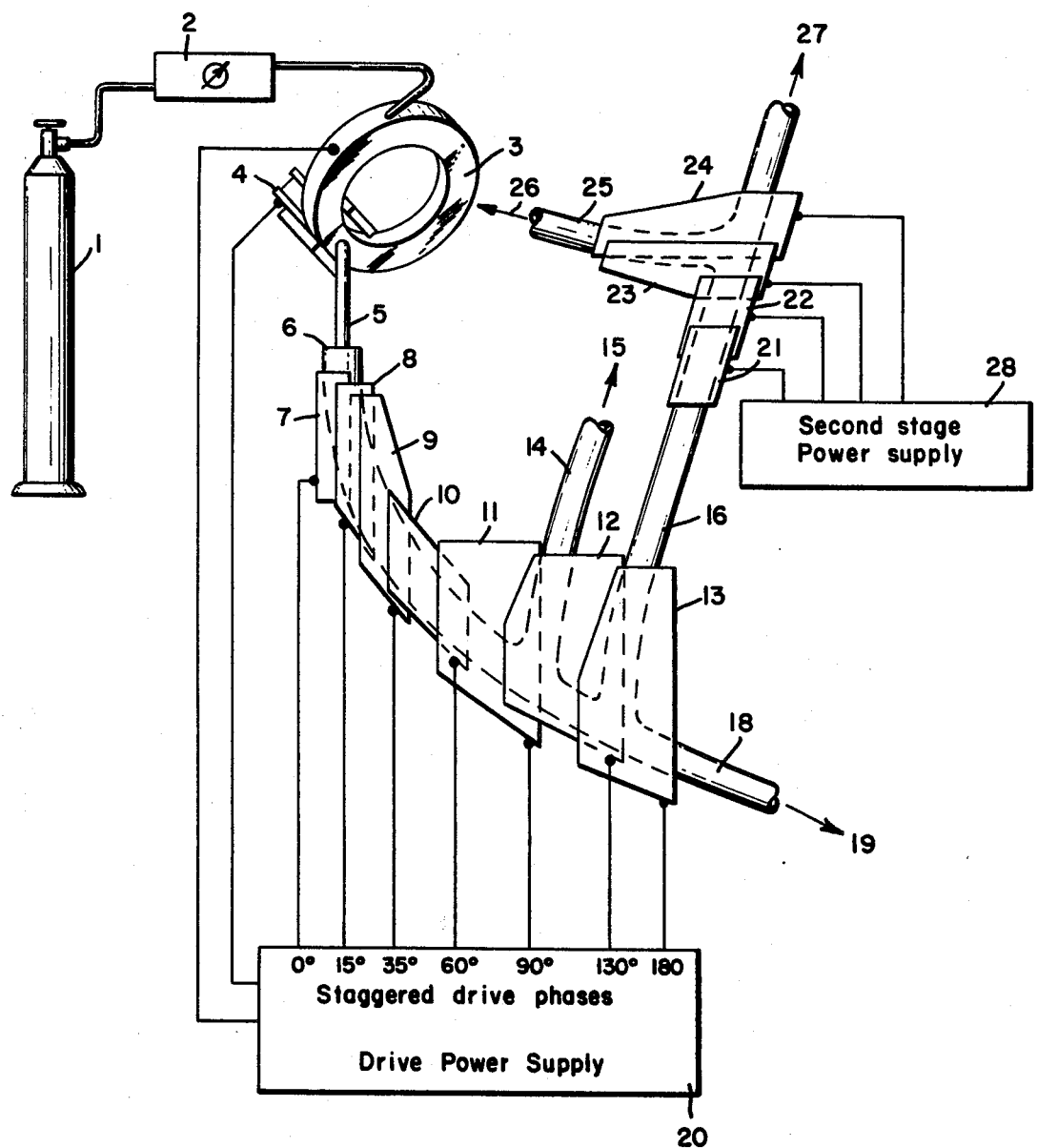
FIG. 4 shows a schematic diagram of a mass separator device of the type shown in FIG. 3 in which a secondary separation/extraction stage has been added.

If the enrichment or purity of a component is not sufficient for the purpose desired, a secondary separation/extraction stage, that is a branch of a branch may be used. This is illustrated in FIG. 4 which contains in addition to the features shown in FIG. 3, a branch 25 derived from branch 16 into which the incompletely purified component has been driven. A second stage power supply 28 together with a series of inductively linked solenoids 21, 22, 23 and 24 divides the incompletely purified packets that have entered branch 16 into two branches. One of these branches 25, contains the more highly enriched component (assumed in the figure to be of lower mass charge ratio). Shape and position of branch 25 depends on the cusp in the trajectory generated by the characteristics of the second stage drive configuration. This further enriched compound is collected at 26, while the remaining plasma packets continue in 16 and are collected at 27. If needed, several such separation/extraction branches may be used in cascade.

As a second example, the separation of a binary plasma mixture by means of the "differential speed" method will be described. For a phase angle of 0°, compression forces will hold the components together in the plasma packets, which in the early part of the cycle will essentially follow the trajectory of the heavier component. Since the lighter particles will move to the front and the heavier ones to the back of the packet, the packet will lengthen and start to fall apart, particularly since the directions in which front and rear part will proceed, are different. Some time after the lighter component has reached its apex, the two separated plasma packets will be sufficiently far apart that they can enter separate branches of the vessel for collection.

Both methods, according to our invention, have the following features in common: pulses generated at a constant frequency produce a train of mixed plasma packets which is exposed to traveling magnetic waves of the same frequency, with a predetermined phase relationship between pulse train and magnetic waves.

Plasma ions of different mass-charge ratio are accelerated in a differential manner. and — by going through a cusp or by the weakening of the compressive force — are divided into separate plasma packets, in some of which the original concentration of a specific ion has been greatly increased or decreased. The traveling magnetic waves are driving each separated plasma packet along a different path into a separate branch of the vessel, where the packet is neutralized and collected.

For the most difficult separation tasks, which usually involve great differences in abundance ratio and small differences in atomic mass, it is necessary to enhance the resolving power and to increase the distance between the branching paths of the rare and the abundant compounds. To achieve this, one may reduce the amplitude of the magnetic waves, change their wave shape in a specific manner, increase their travel velocity, and shorten the length of the plasma packets to be processed.

We claim:

1. An apparatus for the separation of a gaseous plasma mixture into components in some of which the original concentration of a specific ion has been greatly increased or decreased, comprising:
   a constant-frequency pulsed source for converting the gaseous mixture into a train of plasma packets,
   an open-ended vessel with a main section and at least one branch section, adapted to enclose along predetermined tracks the original plasma packets in the main section, and the separated plasma components in each of its branch sections,
   drive means for generating traveling magnetic waves along the predetermined tracks with the magnetic flux vector of the waves transverse to end of the tracks, and
   means for maintaining phase coherence between the plasma packets and the magnetic waves on a value needed for accelerating the components of the mixed packets to different velocities and in such different directions that the mixed plasma is divided into distinctly separate packets in some of which the original concentration of a specific ion has been greatly increased or decreased, and which are collected from separate branches of the vessel.

2. An apparatus as defined in claim 1, in which the magnitude of said phase is chosen to generate a cusp in the track of at least one of the components.

3. An apparatus as defined in claim 1, in which the traveling magnetic waves are generated by solenoids excited by alternating currents in staggered phase relationship.

4. An apparatus as defined in claim 1, in which the traveling magnetic waves are generated by solenoids excited by alternating currents in staggered phase relationship, where the solenoids form an inductively coupled chain.

5. An apparatus as defined in claim 1, in which said traveling magnetic waves have a special nonsinusoidal shape.

6. An apparatus as defined in claim 1, in which already separated ion packets passing through a branching section of the vessel are again subjected to the force of traveling magnetic waves to be driven into a secondary branch, which diverges from the primary branch.

7. A method for separating mixed gaseous plasma packets into separate packets in some of which the original concentration of a specific ion has been greatly increased or decreased, by subjecting the plasma packets to the action of traveling magnetic waves while maintaining phase coherence between waves and plasma packets.

* * * * *